United States Patent [19]
Grego

[11] Patent Number: 5,144,374
[45] Date of Patent: Sep. 1, 1992

[54] OPTICAL SPECTROSCOPY SYSTEM

[75] Inventor: Giorgio Grego, Venaria, Italy

[73] Assignee: Cselt - Centro Studi e Laboratori Telecommunicazioni S.p.A., Turin, Italy

[21] Appl. No.: 684,041

[22] Filed: Apr. 11, 1991

[30] Foreign Application Priority Data

Apr. 27, 1990 [IT] Italy ................... 67314 A/90
Oct. 22, 1990 [IT] Italy ................... 67813 A/90

[51] Int. Cl.$^5$ ............................... G01J 3/12
[52] U.S. Cl. ..................... 356/326; 356/301; 385/123
[58] Field of Search ............ 356/300, 301, 302, 326, 356/328, 331, 332; 250/227.12, 227.23; 359/558, 615; 385/123

[56] References Cited

U.S. PATENT DOCUMENTS 4,823,166  4/1989  Hartog et al. ............... 356/44
4,859,065  8/1989  Bibby ........................... 356/45
4,983,039  1/1991  Harada et al. ............... 356/328

FOREIGN PATENT DOCUMENTS 0089472  9/1983  European Pat. Off. ........ 356/303
0053643  3/1982  Japan ............................ 356/303

OTHER PUBLICATIONS

Orofino et al., *Applied Optics*, vol. 15, No. 8, Aug. 1976, pp. 1907-1909.
Whitten et al, *Analytical Chemistry*, vol. 51, No. 3, Mar. 1979, pp. 417-419.
Whitten et al, *Analytical Chemistry*, vol. 52, No. 1, Jan. 1980, pp. 101-104.
The Streak Camera; Reprinted from Laser Focus Magazine, Aug. 1982, pp. 43-45—Penwell Publishing.
Streak Technology-Aug. 1983.

Primary Examiner—F. L. Evans
Attorney, Agent, or Firm—Herbert Dubno

[57] ABSTRACT

An optical spectroscopy system, wherein a pulse of a radiation to be analyzed is sent to a diffractive element presenting high temporal chromatic dispersion, and information relevant to the radiation spectrum is obtained from pulse broadening in the time domain.

9 Claims, 3 Drawing Sheets

OPTICAL SPECTROSCOPY SYSTEM

FIELD OF THE INVENTION

The present invention relates to optical spectroscopy systems and, more particularly to a high-sensitivity spectroscopy system.

BACKGROUND OF THE INVENTION

Optical spectroscopy systems commonly used to analyze a light radiation spectrum employ prisms or gratings which cause spatial dispersion of the various wavelengths present in the radiation emitted from the source. Wavelengths very closely spaced (e.g. wavelengths which differ by a few nanometers) are to be distinguished in certain cases, such as for instance in characterization of monochromatic sources with a narrow band (e.g. a LED), in Raman or Brillouin spectroscopy etc. Very complex and hence expensive systems must be used to obtain the resolutions necessary in these applications by spatial dispersion. For instance, a system described in the paper "Micro-Raman Studies of Fluoride Glass Optical Fibers", presented by J. A. Freitas, Jr., P. C. Pureza, I. D. Aggarwal and U. Strom at the 6th International Symposium on Halide Glasses, collects and analyses the radiation scattered by a sample by means of a triple spectrometer. Other similarly expensive systems require objectives with very high focal length, which render the system rather cumbersome.

SUMMARY OF THE INVENTION

In accordance with the invention a spectroscopy method and apparatus are provided which present high measurement sensitivity without resorting to complex and expensive optical equipments.

The invention provides a method for spectral analysis of a light radiation, wherein a pulse of said radiation is sent into a diffractive element of known and controlled characteristics capable of causing a temporal dispersion of the various wavelengths in the radiation, and information on such wavelengths is obtained from evaluation of said dispersion.

The invention also provides an apparatus for implementing the method, comprising:
a diffractive element along which a pulse of a radiation to be analyzed propagates and which causes temporal dispersion of the wavelengths in the radiation;
detection and analysis means for supplying information related to the dispersion undergone by a pulse outgoing from the diffractive element; and
a processing system for obtaining the information on the source spectrum from the time information supplied by the temporal analysis means, by comparison with the data relevant to dispersion characteristics of the diffractive element and stored in said processing system.

Advantageously, the diffractive element is an optical fiber with high dispersion.

BRIEF DESCRIPTION OF THE DRAWING

The invention will be better understood with reference to the annexed drawing, in which.

SPECIFIC DESCRIPTION

Before describing in detail the apparatus according to the invention, the principles upon which the invention is based will be briefly discussed.

It is known that a radiation sent into an optical waveguide, e.g. an optical fiber, undergoes dispersion, i.e. the various wavelengths in the radiation propagate at different velocities, so that a pulse emitted from a source with a certain linewidth and duration practically equal to zero will "broaden" assuming a finite duration. Dispersion is basically due to three terms: material dispersion, guiding dispersion (due to refractive index difference between core and cladding) and modal dispersion. The last term is obviously missing in single-mode fibers. Overall dispersion has a behavior shown in FIG. 1, whatever the type of fiber. The actual curve slope depends on the fiber type.

Hence, by detecting at a detector the instants of arrival and disappearance of a pulse outgoing from the fiber and comparing them with the instants of arrival and disappearance of a reference pulse of known wavelength and linewidth, or by measuring the time intervals which separate successive peaks within the pulse, it is possible to immediately obtain information about the various wavelengths present in the pulse, starting from the fiber dispersion characteristics.

It is evident that, while dispersion is a negative factor when using fibers as a transmitting medium for optical communications, which factor must be minimized to allow high transmission rates, a high dispersion is instead an advantage in the present application, and the higher the dispersion, the less sensitive and hence the less expensive the apparatus to be used.

Figure 2:
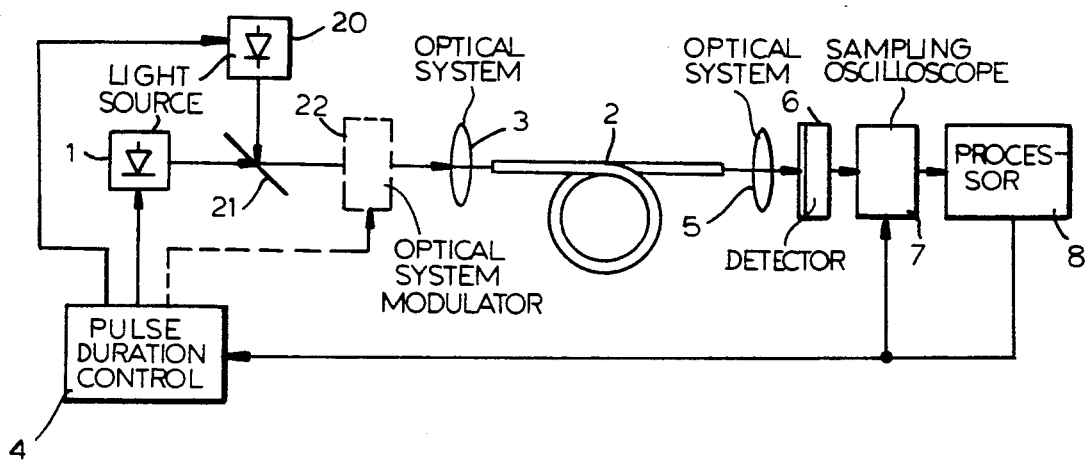
FIG. 2 and 3 schematically show two embodiments of an apparatus for carrying out the invention, relevant to two different applications.
Figure 3:
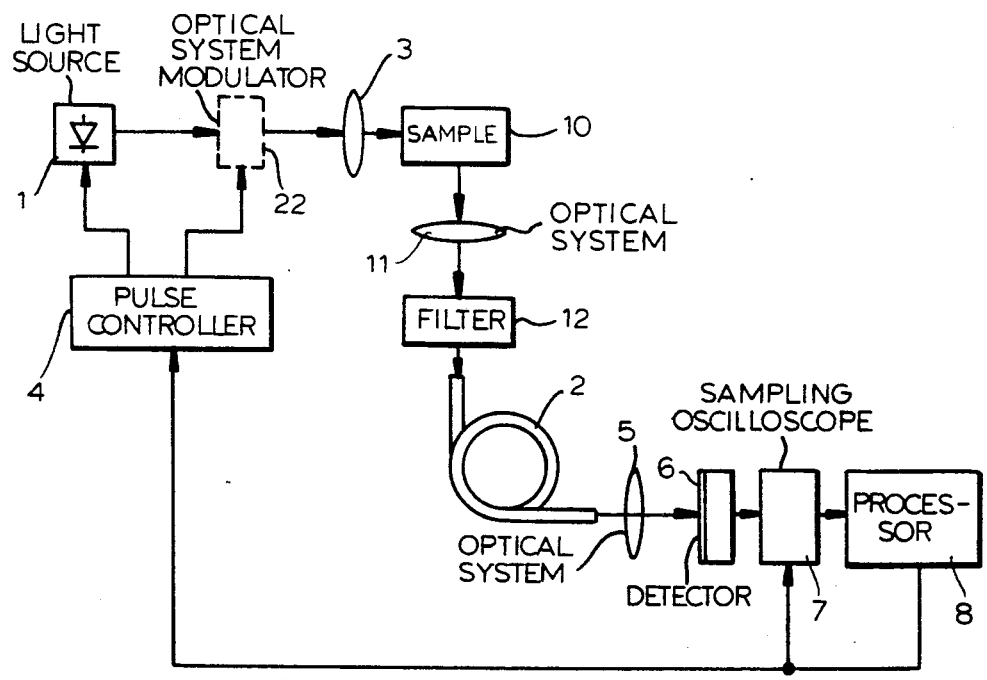

An example of apparatus performing optical spectroscopy in time domain according to the invention is shown in FIG. 2 for the case of analysis of the light emitted by a source and in FIG. 3 for the case of Raman spectroscopy.

In FIG. 2 the light to be analyzed, emitted by a source 1 is coupled to an optical fiber trunk 2 by an optical system schematically indicated at lens 3, after having been possibly combined with the light emitted by a reference source 20, as schematically indicated by mirror 21. Sources 1 and 20 are associated with conventional control units 4, allowing emission of light pulses of predetermined duration either by direct source modulation or through a modulator 22. Advantageously, wavelength $\lambda_R$ of source 20 is that at which the fiber has null dispersion, so that the pulse does not undergo distorsion. The light outgoing from fiber 2 is collected by another optical system schematically represented by lens 5, and sent to a detector 6. The electrical signal outgoing from detector 6 is collected by a temporal analysis device 7, e.g. a sampling oscilloscope, which measures the difference between the instants of arrival of the reference pulse and of the pulse emitted by source 1 and the duration of the latter.

A processing device 8, comprising a memory storing the characteristics of fiber 2 (namely core and cladding refractive indices, numerical aperture and delay) for a wavelength range comprising the wavelengths emitted by source 1 under test and reference source 20, obtains the information about source 1 (e.g. the linewidth of same and hence its central wavelength) from the time information supplied by analysis device 7.

Advantageously, processing device 8 can carry out the synchronization between analysis device 7 and source control means 4.

Figure 1:
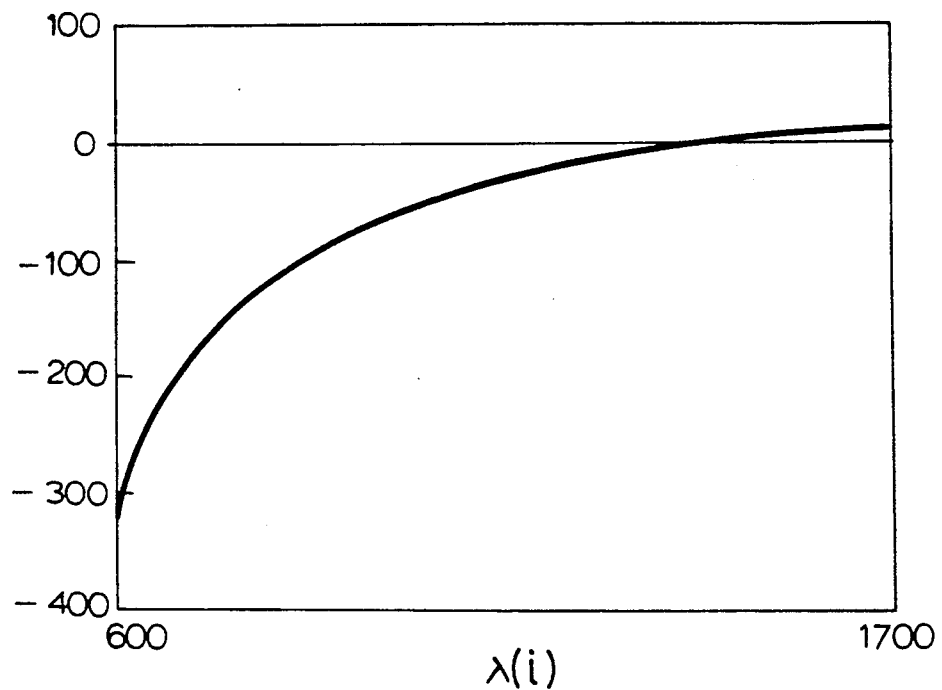
FIG. 1 is a graph of the dispersion of an optical fiber.

In an exemplary embodiment of the invention, source 1 is a LED with central emission frequency 630 nm and linewidth of a few nanometers, and is controlled so as to emit pulses with duration 1 ns. Fiber trunk 2 is a trunk 1 Km long of monomode fiber of silica doped with 3.1% of GeO2, whose dispersion characteristics are exactly as shown in FIG. 1. Such a fiber has a step refractive index profile and, at the source central wavelength, the refractive indices of core and cladding are 1.461 and 1.457 respectively and the numerical aperture is 0.12. That fiber has null dispersion at about 1500 nm (see FIG. 1) while dispersion in the range from 600 to 1000 nm varies from about 308 ps/km.nm to about 60 ps/km.nm at 1000 nm. The fiber characteristics are listed in the annexed table, wherein $\lambda$ is the wavelength in nanometers, $NA(\lambda)$ is the numerical aperture and $T(\lambda)$ is the transit time, measured in picoseconds, along a fiber trunk 1 km long. In the spectral range of that source the delays introduced by fiber trunk 2 are of the order of some nanoseconds. Temporal analysis device 7 is a sampling oscilloscope capable of resolving time intervals of 20 ps. Said oscilloscope, associated with a photodiode 6 with 20 GHz band, allows wavelength resolutions of the order of about 0.15 nm in the source spectrum interval.

The above example clearly shows the high resolution attained by the technique according to the invention. Furthermore, a sampling oscilloscope is much cheaper than a triple monochromator like that disclosed in the cited paper, and is also much less cumbersome than high-resolution single-monochromator systems. The optical fiber trunk has a negligible cost. It is hence evident that the invention provides a sensitive measurement instrument of limited cost.

FIG. 3 shows the apparatus in case of Raman spectroscopy measurements. The elements present also in FIG. 2 have been denoted by the same reference numeralds as in that Figure. As known, Raman spectroscopy exploits the fact that a monochromatic radiation sent into a sample of material to be studied, produces a scattered radiation comprising not only a line at the source wavelength, but further pairs of lines, which are symmetrical with respect to the source line and are spaced therefrom by an extent which is typical of the material under test.

In this application of the invention the light pulse emitted by source 1 is sent onto a sample 10 of the material to be analyzed, and the light laterally scattered by said sample is collected by a suitable optical system 11 and sent onto a filter 12 capable of isolating the useful spectrum portion, more particularly, to attenuate the peak corresponding to the incident radiation, which in this application also carries out the function of providing the reference radiation. The scattered radiation is collected by fiber 2 and sent as before to detector 6, whose output signals are processed by sampling oscilloscope 7 and by processing device 8.

Figure 4:
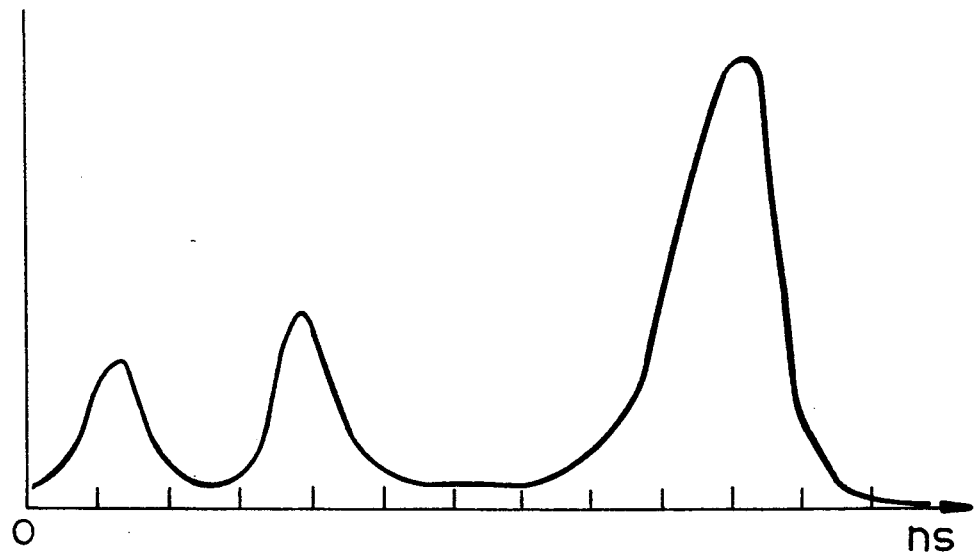
FIG. 4 is an example of spectrum to be analyzed by the apparatus shown in FIG. 3.

Assuming that the spectrum portion at longer wavelengths than the source (the so-called Stokes lines, which have higher intensity than the corresponding Anti-stokes lines, which are symmetrical with respect to the source line) is used in the analysis, the spectrum to be analyzed comprises, as shown in FIG. 4, a main peak at the source wavelength and the Raman scattering peaks, of much smaller amplitude, the first of which is shifted by several nanometers (e.g. 5 to 20 nm in case of a test radiation with wavelength 500 nm) with respect to the source peak. The shift entity is characteristic of the sample material. Supposing that the same fiber and source as above are employed, that first scattering peak will then arrive at the detector with a delay of 1.5 to 6 ns with respect to the main peak, which delay is easily detectable by the described apparatus.

This apparatus, by using an adequate pulse frequency, allows also study of the kinetics of a number of even fast events (e.g. crystal formation, growth, modification) through an evaluation of the variations undergone by the scattering peaks during the event. When a conventional monochromator is used, this would require employment of an array detector which further increases costs and, moreover, has much lower speed limits.

Figure 5:
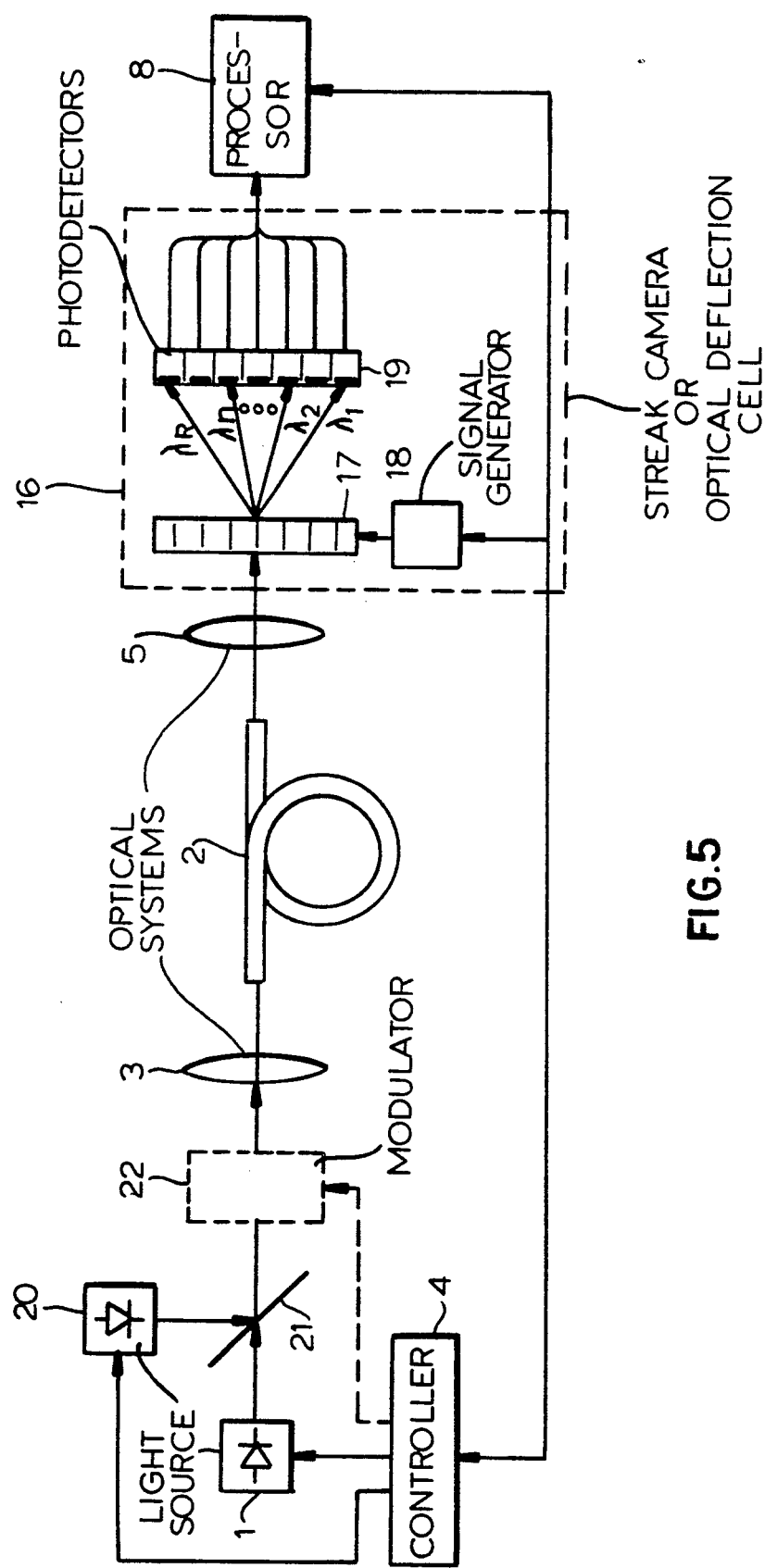
FIG. 5 is a schematic representation of a variant embodiment of the apparatus shown in FIG. 2.

In case very small time dispersions (e.g. of the order of the hundreds of picoseconds or less) are to be evaluated, which would require detectors with very wide band (up to the limits of the present technology), or in case very weak signal intensities are to be detected, the apparatus can be modified as shown in FIG. 5.

Here detector 6 and temporal analysis device 7 of FIGS. 2 and 3 are replaced by a detection and analysis system 16 which advantageously comprises an acousto-optical deflecting cell 17 driven by a signal with periodically varying frequency (e.g. a ramp signal) emitted by a generator 18, and a photodetector array 19, where the individual photodetectors supply output signals whose intensities depend i.a. on the time for which they receive the optical signal to be detected; e.g. the detectors may use charge coupled devices (CCD). Detector array 19 is placed in a plane at a predetermined distance L from cell 17.

By this arrangement, the various wavelengths $\lambda_1, \lambda_2 \ldots \lambda_n$ in the signal emitted by source 1, which arrive at cell 17 at different instants, are differently deflected by said cell, depending on the value of the cell driving frequency at the instant they reach the cell. Hence the different frequencies will be collected by different photodetectors in the array. Preferably, distance L and range $\Delta F$ of variation of the cell driving frequency are chosen so that the different frequencies are distributed over the whole array surface. By duly synchronizing the pulse emission by source 1 and by reference source 20 with the variation of the cell driving frequency and by detecting the position on the array where the reference pulse arrives, taking into account difference $\Delta F$ between the extreme frequencies of the cell modulation frequency range, processing system 8 can obtain the frequency present on each point of the array, since the difference between two frequencies will be proportional to the distance between the detectors by which said frequencies are received.

By using a detector array receiving the different wavelengths at different points and at different instants the problems of the bandwidth of the unique sensor are eliminated. By using charge coupling devices or the like as detectors in the array, that is devices whose output signal is proportional to the integral in time of the input signal, it is possible to send towards detection and analysis system a train of identical pulses and to evaluate the output signal of the individual detectors at the end of the train. It is hence possible to evaluate a signal integrated in time, whose intensity is much higher than that obtainable by sending a unique pulse, and hence good results can be obtained from the spectral analysis also for very low intensities of the individual spectral peaks.

It is clear the photodiode array can be replaced by a single photodiode, still using CCD devices and the like, which scans the signal emerging from the fiber in synchronism with the variation of the driving frequency of cell 17. Photodiode movements will be controlled by processor 8.

In a variant of the apparatus shown in FIG. 5, acousto-optic cell 17 can be replaced by a so-called "streak camera". A streak camera is a device for analyzing the amplitude of pulses having time-varying amplitudes, with resolutions of the order of the picoseconds: the photons of the light pulse to be analyzed are converted into an electron current, whose intensity is proportional to the instant pulse intensity and which is made to pass between deflecting plates controlled by a periodically varying voltage, so that the electrons will be collected by different points of a detector. The distance between two points is proportional to the difference between the emission instants of the respective electron current. In the present application the amplitude variability of the pulse sent to the device is due to the presence of different peaks corresponding to different wavelengths in the light pulse, which spread in time as an effect of the transit in the fiber. The detector can be a photoluminescent screen or an array of charge coupling devices. The operation is equivalent to that of the embodiment using an acousto-optic cell, since a spatial dispersion representing the time dispersion is obtained.

It is clear that what has been described has been given only by way of a non-limiting example and that variations and modifications are possible without departing from the scope of the invention. It is also to be appreciated that, by using a known source, the invention can be used to characterize a dispersive element.

TABLE

| λ | NA (λ) | T (λ) |
|---|---|---|
| 600 | 0.120452 | −306.584461 |
| 610 | 0.120298 | −290.33133 |
| 620 | 0.120152 | −275.229017 |
| 630 | 0.120012 | −261.177982 |
| 640 | 0.119879 | −248.088217 |
| 650 | 0.119752 | −235.872267 |
| 660 | 0.11963 | −224.458426 |
| 670 | 0.119514 | −213.777607 |
| 680 | 0.119403 | −203.774983 |
| 690 | 0.119296 | −194.393727 |
| 700 | 0.119194 | −185.581684 |
| 710 | 0.119096 | −177.297344 |
| 720 | 0.119003 | −169.500631 |
| 730 | 0.118913 | −162.155348 |
| 740 | 0.118826 | −155.220847 |
| 750 | 0.118743 | −148.677358 |
| 760 | 0.118663 | −142.491469 |
| 770 | 0.118586 | −136.635375 |
| 780 | 0.118512 | −131.089374 |
| 790 | 0.118441 | −125.83293 |
| 800 | 0.118373 | −120.843826 |
| 810 | 0.118307 | −116.105734 |
| 820 | 0.118243 | −111.600802 |
| 830 | 0.118182 | −107.313937 |
| 840 | 0.118123 | −103.235426 |
| 850 | 0.118065 | −99.344847 |
| 860 | 0.11801 | −95.629572 |
| 870 | 0.117957 | −92.086567 |
| 880 | 0.117905 | −88.698026 |
| 890 | 0.117855 | −85.458454 |
| 900 | 0.117807 | −82.356255 |
| 910 | 0.117761 | −79.38806 |
| 920 | 0.117716 | −76.542287 |
| 930 | 0.117672 | −73.812695 |
| 940 | 0.11763 | −71.190737 |
| 950 | 0.117589 | −68.672116 |

TABLE-continued

| λ | NA (λ) | T (λ) |
|---|---|---|
| 960 | 0.117549 | −66.251573 |
| 970 | 0.11751 | −63.921663 |
| 980 | 0.117473 | −61.680348 |
| 990 | 0.117437 | −59.520815 |
| 1000 | 0.117402 | −57.438632 |

I claim:

1. A method of spectral analysis of light radiation, comprising the steps of:
   a) sending a pulse of light radiation into a diffractive element of known and controlled characteristics and capable of causing temporal and spatial dispersion of various wavelengths in the radiation sent into said diffractive element;
   b) evaluating the dispersion of the wavelengths in the radiation leaving said diffractive element; and
   c) determining a position of a spatially dispersed pulse on a detector by deflecting wavelengths differently upon output from said diffractive element, thereby obtaining information on said wavelengths.

2. The method defined in claim 1 wherein a pulse of a reference radiation of known characteristics is sent into said diffractive element together with a pulse of radiation under test and information on wavelengths of the radiation under test is obtained from relative positions of points of arrival of the pulses of the reference radiation and the radiation under test.

3. The method defined in claim 1 wherein a train of pulses of a radiation to be analyzed is sent into said diffractive element and the pulses emerging from the diffractive element are collected by a detector supplying an output signal integrated in time, the integrated signal being evaluated at the end of said pulse train.

4. An apparatus for the spectral analysis of a light radiation, comprising:
   a source emitting pulses of said radiation;
   a diffractive element positioned to receive said light radiation from said source, along which a pulse of said radiation propagates and causing time and spatial dispersion of the wavelengths present in the radiation and outputting radiation which has been subjected to time and spatial dispersion;
   detection and analysis means receiving radiation subjected to time and spatial dispersion of wavelengths present in the radiation, for supplying information relating to dispersion undergone by the pulse because of propagation along said diffractive element; and
   a processing system extracting information on a spectrum of said source from output signals of said detection and analysis means by comparison of said output signals with data relevant to dispersion characteristics of said diffractive element stored in said processing system, said detection and analysis means comprising means receiving radiation outgoing from said diffractive element and subjecting it to deflection, said processing system obtaining information on the spectrum from positions at which different ones of said wavelengths arrive on a detector of said detection and analysis means.

5. The apparatus defined in claim 4 wherein said diffractive element is a high dispersion optical fiber.

6. The apparatus defined in claim 4 wherein said detection and analysis means further comprises temporal analysis means adapted to analyze a difference between transit times in said diffractive element of simultaneous pulses of said radiation and reference radiation and said apparatus further comprises a source of pulses of said reference radiation which are combined with pulses of the first mentioned radiation supplied to said diffractive element.

7. The apparatus defined in claim 4 wherein an acousto optical cell driven by a variable frequency forms part of said detection and analysis means and subjects said wavelengths to deflection.

8. The apparatus defined in claim 4 wherein said detection and analysis means includes a streak camera.

9. The apparatus defined in claim 4 wherein said detector is arranged to supply an output signal proposal to an integral in time of an input signal applied to said detector.

* * * * *